Feb. 19, 1929.
W. H. GREEN
1,702,256
WATER SOFTENING APPARATUS
Original Filed March 21, 1924
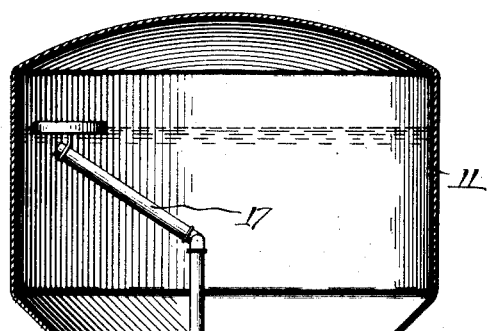
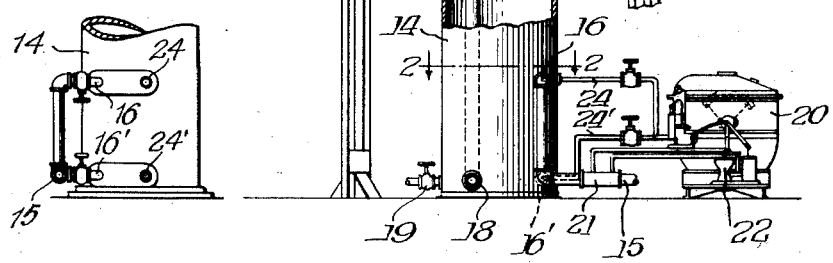
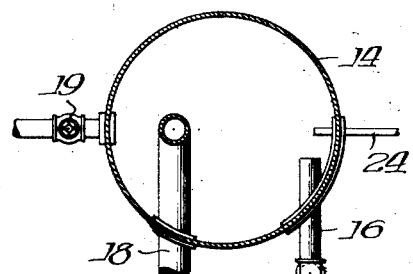
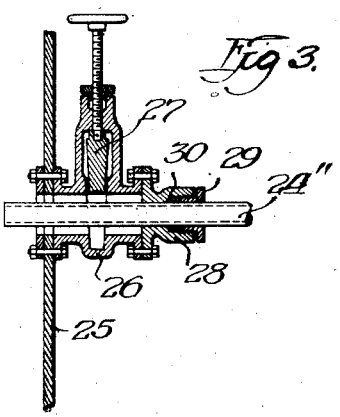
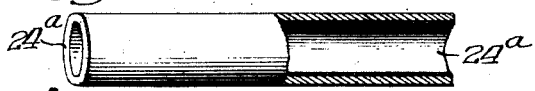
Inventor:
Walter H. Green Patented Feb. 19, 1929.

1,702,256

UNITED STATES PATENT OFFICE.

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

WATER-SOFTENING APPARATUS.

Application filed March 21, 1924, Serial No. 700,765. Renewed December 24, 1928.

This invention relates to improvements in apparatus for use in precipitation methods of water softening, of which the lime and soda treatment is an example.

The general object of the invention is the provision of apparatus which will be effective to secure thorough mixture of the treating materials with the raw water and expedite the process of sedimentation, thereby attaining a high rate of output.

Incidental objects comprise the provision of an apparatus which may be installed in minimum ground space, which affords facilities for storage of treated water, which facilitates regulation and control of the chemical treatment, and which is so simple as to be practically free from structural or functional disorders.

Another object is the provision of apparatus which operates automatically to control the time element in the treatment of the water, to the end that water cannot be withdrawn for use until after it has been subjected to the requisite mixing and sedimentation manipulations for an established period of time.

Other objects comprise the improvement in features of construction which will facilitate the maintenance of the apparatus in operable condition.

Other and further objects of the invention will be pointed out hereinafter, indicated in the appended claims, or obvious upon an understanding of the present disclosure. For the purpose of this application, I have elected to show herein one form in which the invention may be embodied, but it is to be understood that the same is here presented for illustrative purpose only, and hence is not to be recorded any interpretation which might have the effect of limiting what I purport to secure by Letters Patent, short of its true and most comprehensive scope in the art.

In the drawing forming a part of this specification,

Fig. 1 is a diagrammatic illustration of an apparatus partly in elevation and partly in sectional elevation;

Fig. 2 is a diagrammatic illustration in the nature of a cross section on the line 2—2 of Fig. 1;

Fig. 3 is a detail in the nature of a sectional elevation illustrating a form of connection between a chemical pipe and treating tank, Fig. 4 is a detail illustrating a chemical pipe of special construction, and Fig. 5 is an elevational detail showing auxiliary supply connections of the apparatus.

The nature of the invention will best be understood by reference to the illustrative embodiment in detail, in which the various parts are designated by reference characters. Let it be understood that the reference numerals 10 designate suitable supports or columns which sustain the treating receptacle. The treating receptacle is in the nature of a tank having its upper portion 11 preferably of cylindrical form, an intermediate portion 12 of downwardly contracting form, and a lower portion 14, of substantially less area than the upper portion 11, and preferably of cylindrical form.

For the purpose of arbitrary designation, I will call the portion 11 the storage drum, the portion 12 the sedimentation cone, and the portion 14 the mixing leg. The latter constitutes a reaction chamber, as hereinafter pointed out. These are arranged coaxially and with unobstructed communication between them. With this receptacle is associated the supply conduit 15, to which the raw water is supplied under sufficient head or pressure to rise to the necessary elevation in the receptacle. Water from this supply conduit is discharged into the mixing leg through an inlet 16, which is arranged to discharge along the inner wall of the leg in such fashion as to set up a whirling movement of the water in the latter. An outlet 17 is arranged to discharge water from a proper elevation in the storage drum 11, the conduit 18 being arranged to convey such water to the desired point of disposal or use. A washout tap 19 is arranged at the bottom of the mixing leg, through which sediment may be discharged from the receptacle.

With the treating receptacle is associated the chemical supply apparatus 20. This preferably is of the type illustrated in my United States Letters Patent No. 1,321,622, granted November 11, 1919. It is to be understood that the chemical supply apparatus is operable to supply to the treating receptacle the reagents appropriate for treatment of the raw water, such as solutions of lime and soda ash. Suitable control means 21 and 22, such, for example, as illustrated in the application of Milton F. Stein, Serial No. 483,643, are provided for the purpose of regulating the supply of treating material to maintain it in the desired proportion to the quantity of raw water supplied per unit of time. The treating solutions are discharged into the mixing leg 14 through the pipe 24, the discharge end of which preferably is adjacent the inlet 16 and in the path of the water discharged therefrom.

In operation, the raw water being discharged within the mixing leg 14 from the inlet 16, and the treating solution being discharged in the desired ratio thereto from the pipe 24, they at once commingle and take a whirling course of travel in the mixing leg, which is effective to agitate the dosed water, while it gradually rises as more water is introduced. Incident to this passage through the leg 14, the water is subjected to the reaction with the treating material for precipitation of the scale-forming elements. Upon reaching the lower limit of the sedimentation cone 12, the rising water fills the increased area afforded by that portion of the receptacle. Incident to this spreading out, the water maintains its whirling course, but its rate of travel is substantially reduced, said reduction continuing as it rises through the gradually increasing area. The condition thus presented contributes very effectively to rapid sedimentation of matter precipitated by the treating material and suspended in the water, the sediment rolling down the sloping sides of the sedimentation cone and showering down through the relatively rapidly revolving water more recently introduced into the mixing leg, where it exercises an influence contributing to the agglomeration and precipitation of matter suspended therein. The rotary movement of the water in the precipitation zone is effective to prevent the formation of localized currents or flows which would tend to short circuit water from the mixing leg to the storage drum, and thereby controls the movement of all the water in such fashion as to give it the gradually decreasing rate of progressive flow incident to its rise. From the sedimentation cone the rising water enters the storage drum, where it remains in a substantially tranquil state until reaching the elevation of the discharge, through which it is drawn off. I have shown the discharge as float controlled, but it is evident that its elevation may be fixed. Its arrangement is such, however, that water cannot be discharged through it until it has risen to a predetermined level in the storage drum. This subjects all the water passing through the apparatus to treatment of the desired duration. Of course, sedimentation from water in the storage drum may take place, the precipitate finding its ultimate resting place at the bottom of the mixing leg 14. Thence the accumulated sludge may be flushed out through the cleanout tap 19.

In instances it may be desirable to mix some of the sludge, which has been subjected to the action of the reagents, with the incoming raw water, as under some conditions such procedure has the effect of augmenting the precipitation of suspended matter from the latter, and permits utilization of unused treating material which may have settled in the sludge. To accommodate this, an alternative inlet 16' may be provided, as best disclosed in Fig. 5, entering the leg 14 near its bottom, through which raw water may be introduced from the supply pipe 15 in such fashion that deposits collected in the bottom of the mixing leg are commingled with it. When the apparatus is operated in that fashion the treating material may be introduced through the auxiliary chemical pipe 24', which enters the mixing leg in front of the auxiliary inlet, or it may be introduced above that inlet, through pipe 24.

In the handling of the milk of lime and the soda ash solutions, the metallic pipes through which they are conveyed from the chemical supply source 20 become fouled with incrustations or deposits, necessitating periodic cleaning or substitution of other pipes. In Fig. 3 I have illustrated an arrangement for facilitating such procedure. The side wall of the treating receptacle is designated by the reference character 25. On this is mounted the housing 26 of a gate valve 27, which housing supports the stuffing box 28, having the gland 29 for compressing the packing 30. These accommodate the chemical pipe 24", upon which the packing 30 is tightly compressed by the gland 29 so as to maintain the discharge end of the pipe in the proper location. When cleaning or replacing of the chemical pipe is desired, the gland 29 is backed off sufficiently to free the pipe 24 to an extent permitting withdrawal of the discharge end past the valve 27. The latter is then closed, and the pipe completely withdrawn from the stuffing box, to be restored after cleaning, or replaced by another, by reversal of the operations just described. Elimination of the incrusting of the chemical pipes may be accomplished by utilizing in them a rubber lining 24ª, as illustrated in Fig. 4, such a coating of rubber being applied to the surface portions subjected to contact with the chemical solution, or by making the same of rubber.

Apparatus as above described is of particular efficiency in that it affords a continuous supply of treated water, maintains uniformity of treatment automatically, requires minimum space for treatment and storage, as both are accomplished within the same area, and maintains the continuity of the purifying procedure throughout all the time during which the water is in the apparatus. A very advantageous feature resides in the fact that the progress of the water is always upward, a factor which not only contributes to the sedimentation of the suspended matter, but also leaves the fully treated water in position where it may be withdrawn or distributed under its own head. A feature of the present apparatus which is of great practical advantage is the facility with which the liquid handling pipes and apparatus may be protected against freezing. The mixing leg 14 together with the chemical preparing and proportioning apparatus and the connection pipes, all may be housed very conveniently with a comparatively low structure, which will be effective to protect those parts against freezing temperatures. The upper portions of the tank, because of their large size and capacity, do not jeopardize the operability of the apparatus by freezing. Because of the simplicity, functional disorders and interference from fouling are practically obviated, and efficient performance is secured in installations varying widely in size.

I claim:

1. In water treating apparatus, a treating receptacle comprising a storage portion, a sedimentation portion below the same and decreasing in cross sectional area downward, and a mixing portion below the sedimentation portion and forming an extension thereof, said mixing portion being of much smaller cross sectional area than the storage portion, and all of said portions being in unobstructed communication with one another, in combination with means for introducing raw water and treating material for reaction in the mixing portion and means for withdrawing water from the storage portion.

2. In a water treating apparatus, a treating receptacle comprising a sedimentation portion decreasing in cross sectional area downward, and a mixing portion below the sedimentation portion and forming an extension thereof, said mixing portion being of much smaller cross sectional area than the largest area of the sedimentation portion, and said sedimentation and mixing portions being in unobstructed communication with one another, in combination with means for introducing raw water and treating material for reaction in the mixing portion and means for withdrawing water from above the sedimentation portion.

3. In a precipitation water softening apparatus a treating receptacle comprising a frustrated conical-like sedimentation portion decreasing in cross sectional area downward, and a cylindrical mixing portion below the sedimentation portion and forming an extension thereof, said mixing portion having a cross sectional area equal to the smallest cross sectional area of the conical-like sedimentation portion, and said sedimentation and mixing portions being in unobstructed communication with each other in combination with means for introducing raw water and hardness-precipitating chemicals for reaction on the mixing portion and means for withdrawing water from above the sedimentation portion.

In testimony whereof I have hereunto signed my name.

WALTER H. GREEN.